United States Patent [19]

Tsuchiya et al.

[11] 4,372,602
[45] Feb. 8, 1983

[54] SMALL-SIZED VEHICLE

[75] Inventors: Toshio Tsuchiya, Kawagoe; Akito Enokimoto, Asaka; Sadao Mizushima, Tokyo; Suwaji Takano, Urawa, all of Japan

[73] Assignee: Honda Giken Kogyo Kabushiki Kaisha, Tokyo, Japan

[21] Appl. No.: 201,530

[22] Filed: Oct. 28, 1980

[30] Foreign Application Priority Data

Oct. 31, 1979 [JP] Japan ................................ 54-14069

[51] Int. Cl.³ ............................................. B62J 17/00
[52] U.S. Cl. ............................. 296/78 R; 280/289 S; 296/37.1; 296/78.1
[58] Field of Search .................. 296/78 R, 78.1, 84 R, 296/37.1, 37.6; 280/289 S, 289 G

[56] References Cited
U.S. PATENT DOCUMENTS

| 816,013 | 3/1906 | Hull | 296/78 R |
|---|---|---|---|
| 3,333,888 | 8/1967 | Williams | 296/78 R |
| 3,829,152 | 8/1974 | Hobbs | 296/78 R |
| 4,014,589 | 3/1977 | Yerkey | 296/78 R |
| 4,066,291 | 1/1978 | Hickman | 296/78.1 |
| 4,237,995 | 12/1980 | Pivar | 296/78.1 |

Primary Examiner—Joseph F. Peters, Jr.
Assistant Examiner—John A. Carroll
Attorney, Agent, or Firm—Irving M. Weiner; Pamela S. Burt; John L. Shortley

[57] ABSTRACT

A small-sized vehicle having two front wheels steerable by a handlebar is provided with a windshield unit extending from a front end of a vehicle body upwardly and rearwardly in overhanging relation to the handlebar and a driver's seat mounted on the vehicle body rearwardly of the handlebar. The windshield unit is cross-sectionally channel-shaped and includes a lower cover fastened to the body and a windshield panel extending upwardly of the lower cover, the windshield panel supporting a pane of glass having an extensive area in front of the head of a seated driver. The unit further includes a roof plate attached to and extending from an upper end of the windshield panel rearwardly in overhanging relation to the seat so as to cover the driver's head. The windshield unit is provided with a container therein, the container being disposed forwardly of and adjacent to a column supporting the handlebar, and being adapted to accommodate therein articles desired to be transported. The windshield unit is detachably mounted on the vehicle body such that the unit can be easily dismounted for separate shipment and for facilitating maintenance and servicing.

12 Claims, 12 Drawing Figures

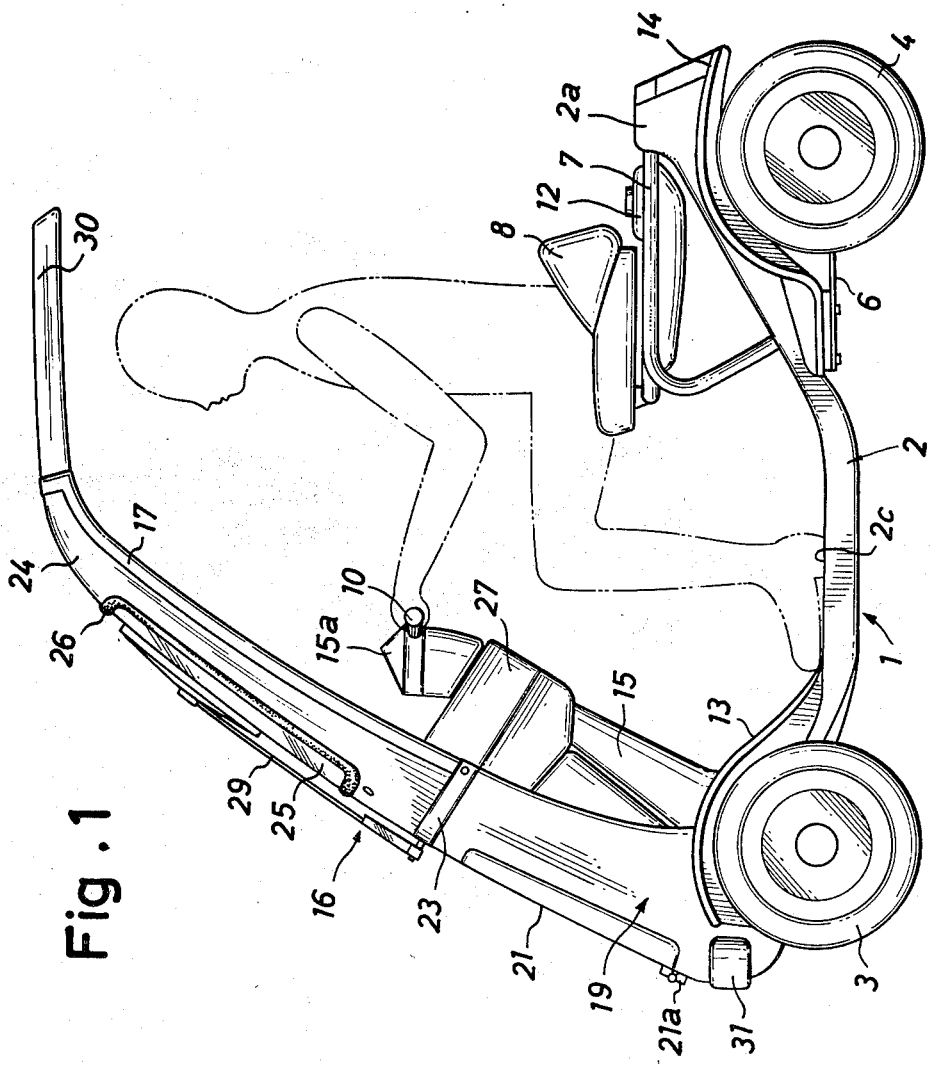

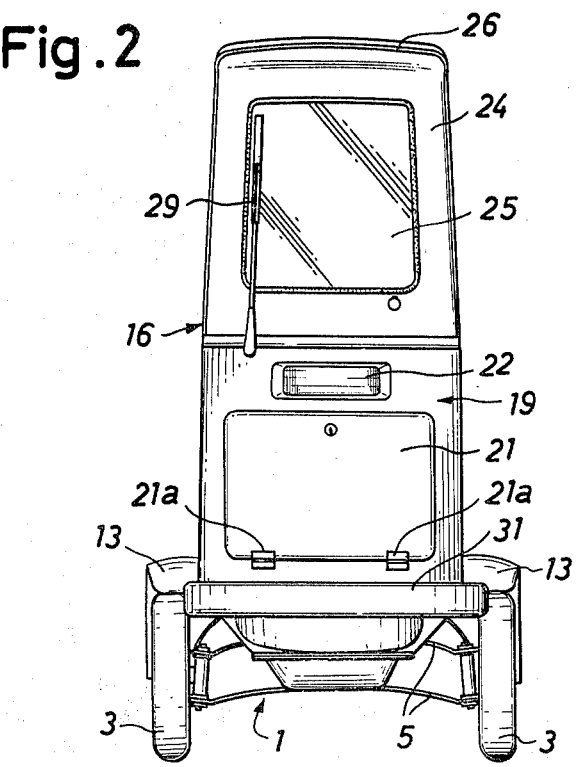
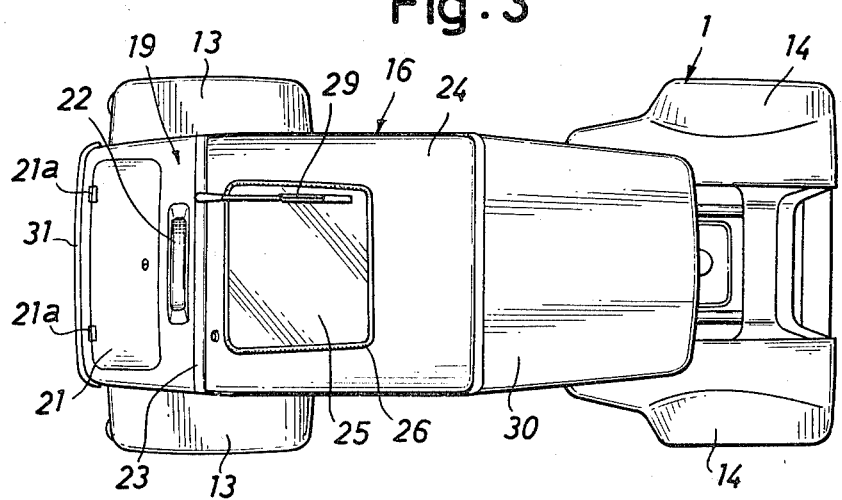

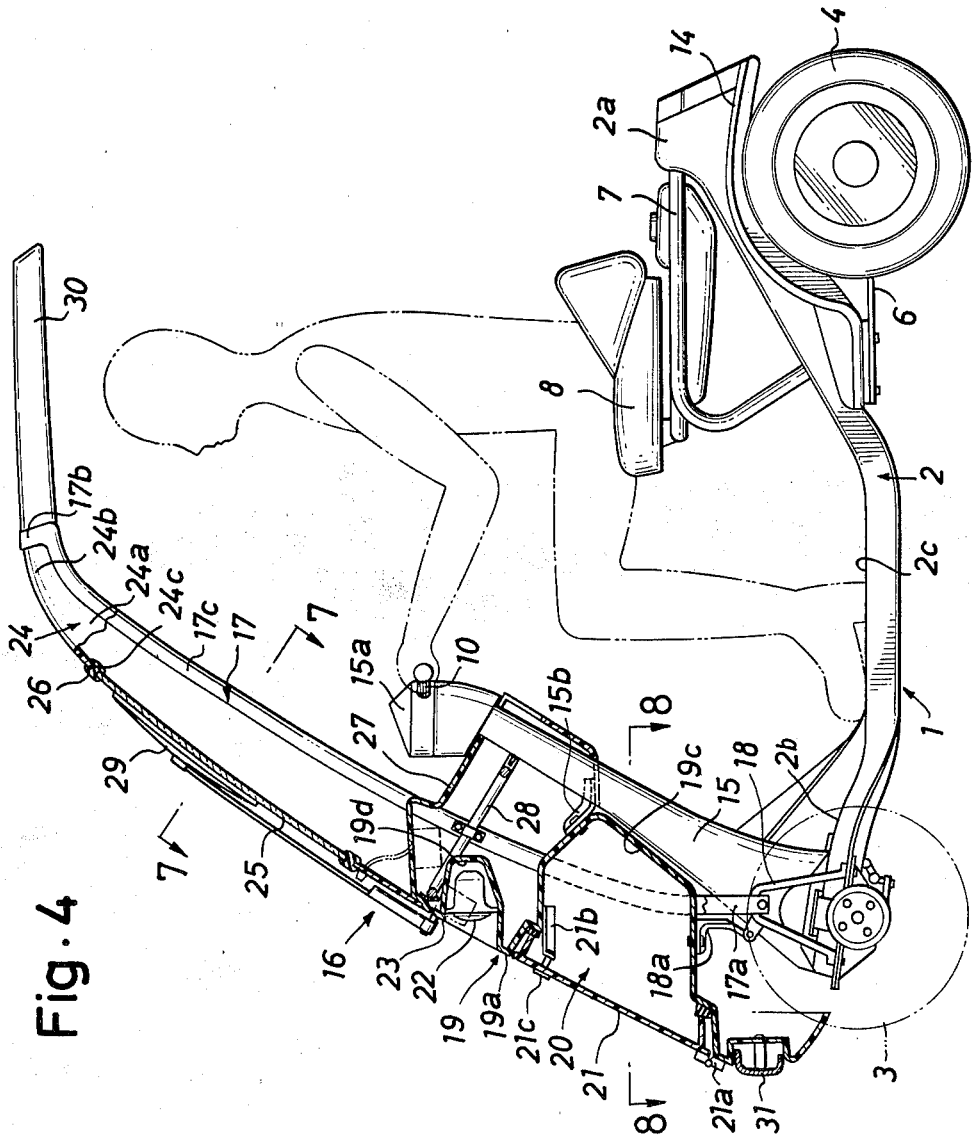

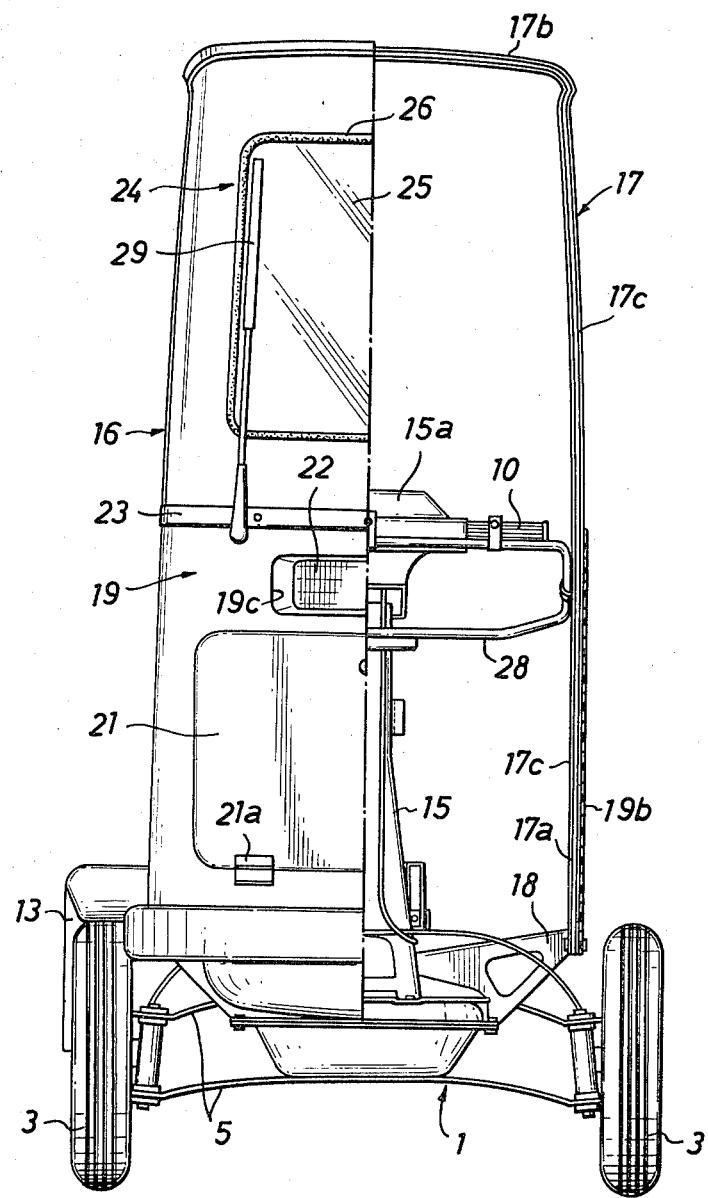

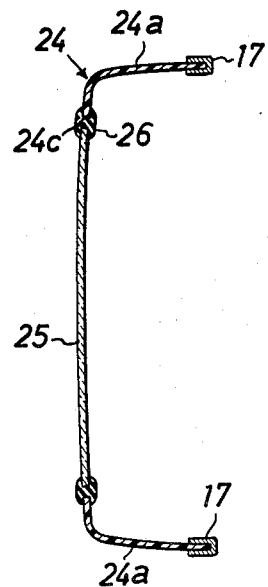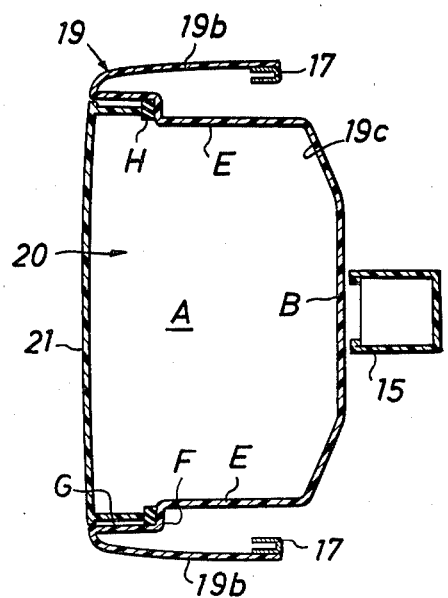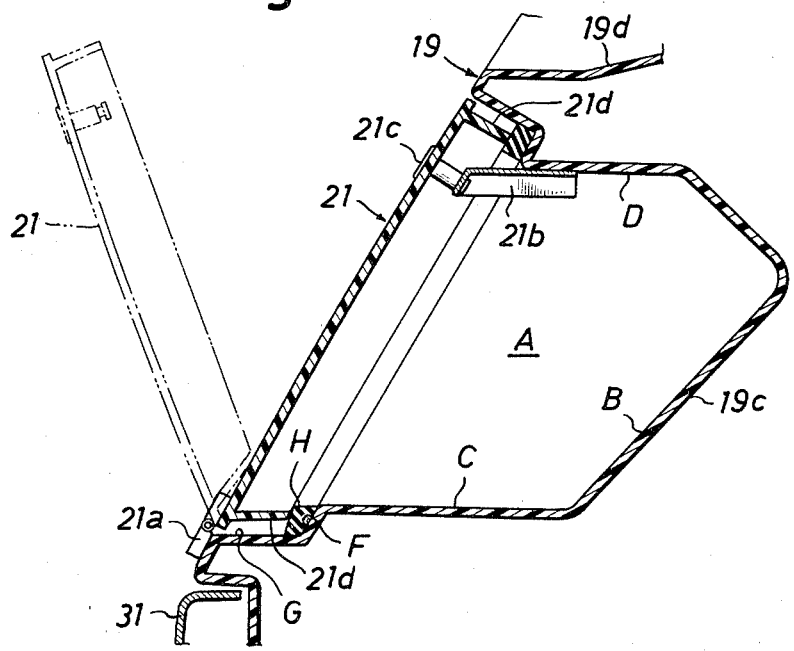

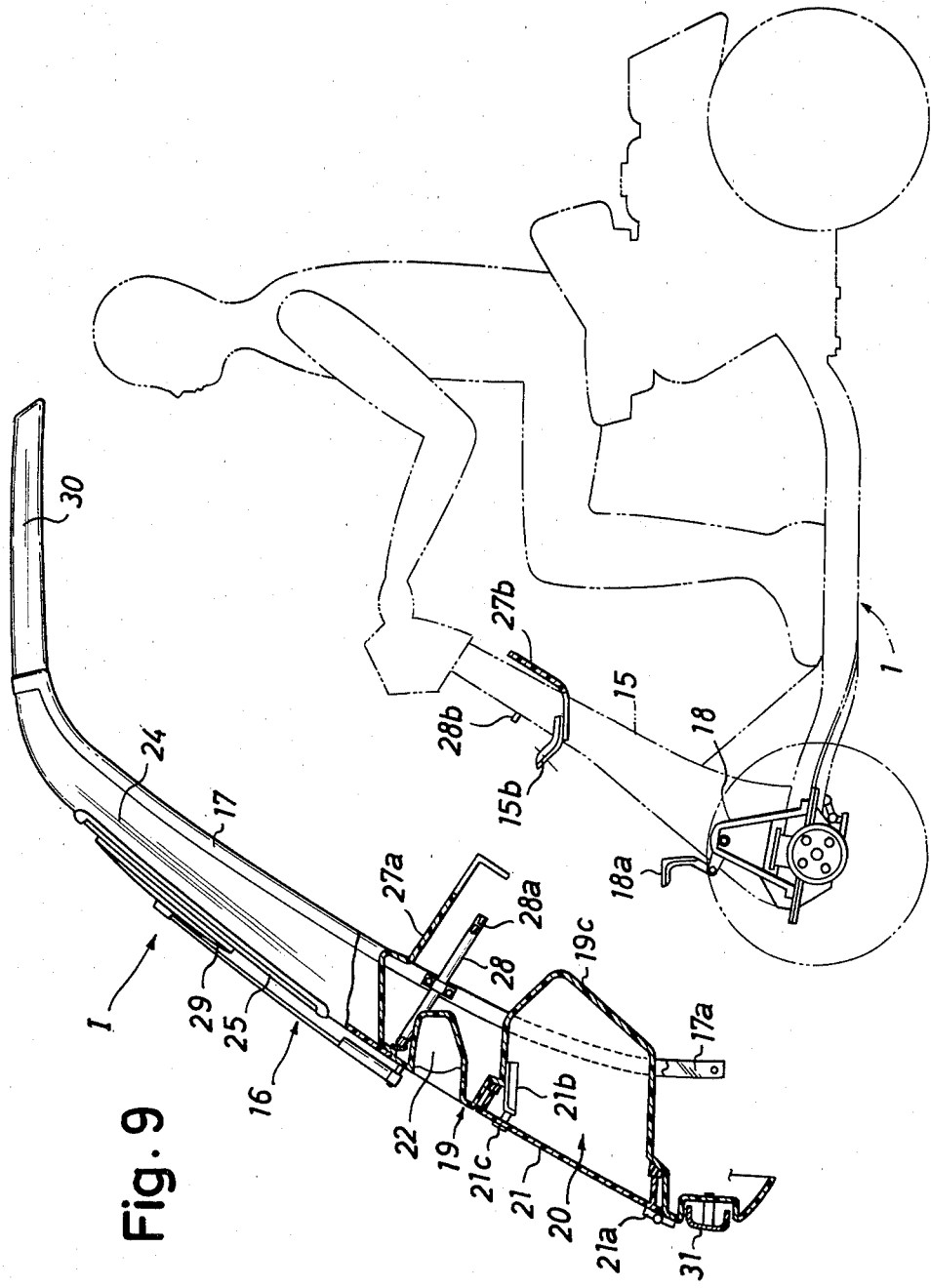

SMALL-SIZED VEHICLE

BACKGROUND OF THE INVENTION

1. Field of the Invention

The present invention relates generally to a small-sized vehicle having two front wheels. More particularly, the invention relates to a small-sized weatherproof scooter-like vehicle having two front wheels and at least one rear wheel.

2. Description of Relevant Art

Two-wheeled, easy-to-drive vehicles equipped with a relatively small-sized engine having a small displacement have been generally known. Such two-wheeled vehicles are generally classified into bicycle-like vehicles and scooter-like vehicles, neither of which can be operated by persons who are unable to ride a conventional bicycle.

Three-wheeled vehicles equipped with an engine have also been proposed and used. Such three-wheeled vehicles are relatively large in size in comparison with two-wheeled vehicles and scooters, are complicated in structure, and are heavy, with the engine thereof having a relatively larger displacement. Accordingly, such three-wheeled vehicles are considerably more difficult to handle and drive.

There has been proposed a small-sized three- or four-wheeled vehicle which can be easily driven by persons able to ride a conventional bicycle, can be handled in substantially the same manner as bicycles, is small in size and lightweight, and can be manufactured as inexpensively as two-wheeled vehicles. However, the need has arisen in connection with such proposed vehicle to weatherproof the same, and to provide windshield means to protect against wind and rain, while at the same time retaining favorable roadability and maneuverability characteristics. The windshield means should desirably be simple in structure, lightweight, and high in mechanical strength. Further, it has been desired to equip such a vehicle with a covered container for accommodating articles desired to be transported.

The present invention effectively meets the foregoing demands imposed on small-sized easy-to-handle vehicles having two front wheels.

SUMMARY OF THE INVENTION

The present invention provides a small-sized vehicle including a vehicle body having a pair of front wheels, with a handlebar for steering the front wheels being disposed substantially centrally in the width direction of a front portion of the vehicle body. A driver's seat is disposed substantially centrally in the longitudinal direction of the vehicle body, and a footrest floor extends between the handlebar and the seat. A windshield unit is mounted on and extends upwardly and rearwardly from a front end of the vehicle body so as to be disposed in overhanging relation to the handlebar and the driver's seat.

It is an object of the present invention to provide a small-sized vehicle which is weatherproof so as to protect the driver against rain and wind, whether the vehicle is in motion or at rest.

Another object of the present invention is to provide such a weatherproof vehicle which enables the driver to get on and off the vehicle, manipulate the handlebar, and drive the vehicle with utmost ease.

Still another object of the present invention resides in the provision of a small-sized weatherproof vehicle which is simple in structure, lightweight, easy to handle, and inexpensive to construct.

A further object of the present invention is to provide a small-sized weatherproof vehicle having a unitary windshield detachably mounted on the vehicle body and removable so as to facilitate shipment and servicing.

Another object of the present invention resides in the provision of a small-sized weatherproof vehicle having a unitary windshield which is mounted on the vehicle body in a cantilevered fashion and has a channel-shaped cross section for increased mechanical strength and rigidity, such windshield being lightweight and having a simplified structure.

Still another object of the present invention is to provide a small-sized weatherproof vehicle having a windshield unit including a container therein with a frontal hinged lid.

According to the present invention, a small-sized weatherproof vehicle is provided with a windshield unit disposed forwardly of a steering handlebar and extending upwardly and rearwardly from a front end of a vehicle body. The windshield unit is substantially channel-shaped in horizontal cross section opening rearwardly and comprises a lower cover mounted on the vehicle body, a windshield panel connected to the lower cover, and a roof plate connected to the windshield panel, the windshield panel having a pane of glass supported thereon so as to provide the driver with a forward view. The windshield unit has an overall width which is substantially the same as the length of the handlebar and is spaced forwardly from the handlebar, so that the driver is permitted to manipulate the handlebar without interference or obstruction, to view surrounding traffic conditions easily, and to get on and off the vehicle easily from the sides thereof. The windshield unit includes a frame having an inverted U-shaped configuration in its entirety and mounted at lower ends thereof on the vehicle body in a cantilevered fashion. Each upstanding portion of the frame has a channel-shaped cross section in which lateral edges of the lower cover and the windshield panel are inserted and retained. The lower cover and the windshield panel are supported by brackets on a column upon which the handlebar is mounted. The windshield unit is detachably mounted on the vehicle body for ready removal to permit separate shipment and to facilitate maintenance and servicing. The windshield unit includes a container therein for storing articles desired to be transported, the container having a hinged lid comprising a part of the lower cover. The container is disposed in a space defined forwardly of the handlebar column and just above the vehicle body, so that the articles housed in the container can lower the center of gravity of the vehicle for stabilized roadability of the vehicle.

The above and other objects, features and advantages of the present invention will become apparent from the following detailed description when read in conjunction with the accompanying drawings which illustrate a preferred embodiment of the present invention by way of example.

BRIEF DESCRIPTION OF THE DRAWINGS

FIG. 1 is a side elevational view of a vehicle according to the present invention.

FIG. 2 is a front elevational view of the vehicle.

FIG. 3 is a plan view of the vehicle.

FIG. 4 is an enlarged side elevational view of the vehicle, partially cut-away.

FIG. 5 is a front elevational view of the vehicle, with parts broken away.

FIG. 7 is an enlarged cross-sectional view taken along line 7—7 of FIG. 4.

FIG. 8 is an enlarged cross-sectional view taken along line 8—8 of FIG. 4.

FIG. 9 is a side elevational view of the vehicle with a windshield unit detached.

FIG. 10 is an enlarged vertical cross-sectional view of a container in accordance with the invention.

DETAILED DESCRIPTION OF PREFERRED EMBODIMENTS

Figure 11:
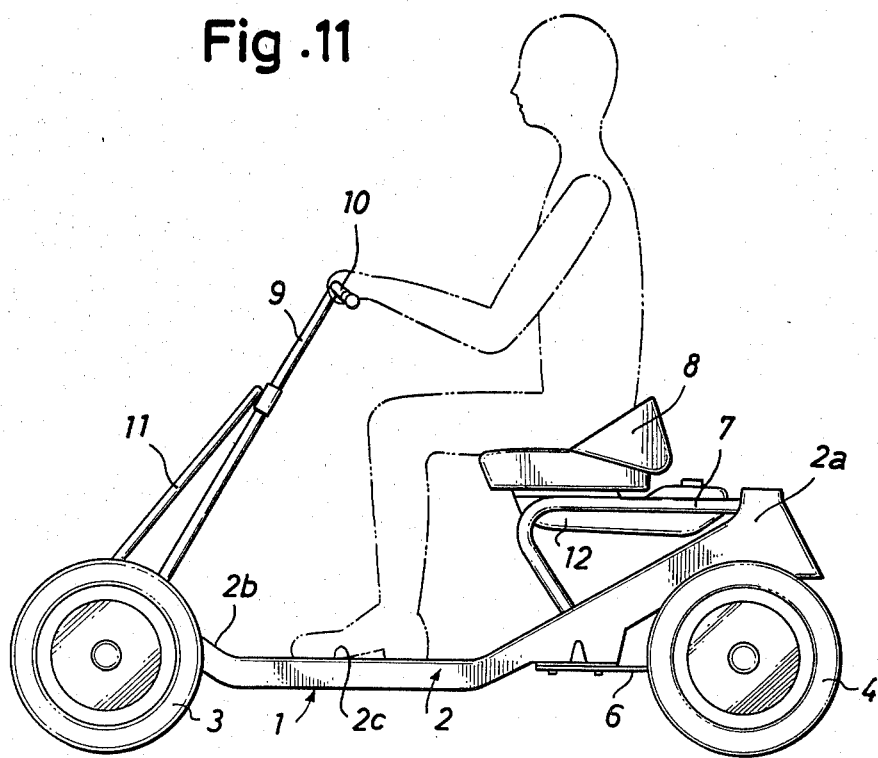
FIG. 11 is a side elevational view of a vehicle to which the present invention is applicable.
Figure 12:
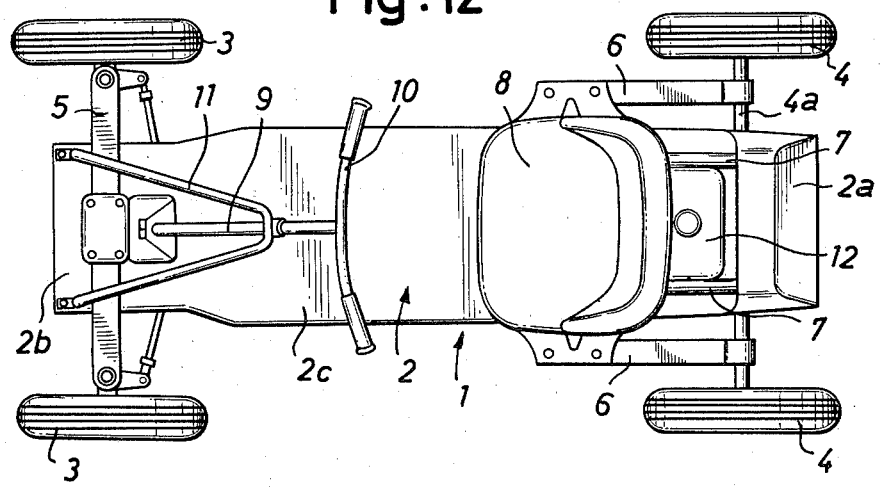
FIG. 12 is a plan view of a vehicle to which the present invention is applicable.

FIGS. 11 and 12 show a small-sized vehicle 1 having two front wheels and two rear wheels, to which the present invention is applicable. Although not shown, it will be understood that the invention is also applicable to a small-sized vehicle having two front wheels and a single rear wheel.

The vehicle 1 has a body 2 including a rear portion 2a extending rearwardly and upwardly and a front portion 2b. A pair of front steerable wheels 3, 3 are supported by and disposed on respective opposite sides of the front portion 2b. A pair of rear driving wheels 4, 4 are supported by and disposed on respective opposite sides of the rear portion 2a. The rear wheels 4, 4 are driven by an engine (not shown) mounted below the rear portion 2a. The front wheels 3, 3 are mounted on a pair of lateral damper suspension springs 5 disposed in sandwiching relation to the front body portion 2b. An axle 4a of the rear wheels 4, 4 is rotatably mounted on a pair of damper suspension leaf springs 6, 6 extending on respective opposite sides of the rear portion 2a rearwardly of a front end of the rear portion 2a which is below a driver's seat 8. The seat 8 is supported on a pair of support stays 7, 7 mounted on the rear body portion 2a, and is disposed substantially centrally in the longitudinal direction of the body 2. A steering shaft 9 projects upwardly at the center in the width direction of the front body portion 2b and is provided at the upper end thereof with a handlebar 10 so as to define a T-shaped configuration. The steering shaft 9 is rotatably supported by a stay 11 mounted on the front body portion 2b. Disposed beneath the seat 8 is a fuel tank 12.

The width dimension of vehicle body 2 is substantially the same as the width of the average driver's shoulder, and the length of the body 2 is substantially the same as that of conventional motorcycles. The body 2 includes a footrest floor 2c disposed substantially below the seat 8 and at a level which permits the driver to be seated comfortably with his legs approximately right-angled and which permits the driver to contact the ground with his feet simply by lowering them sideways off the footrest floor 2c.

As shown in FIGS. 1 through 3, a pair of front fenders 13, 13 are mounted on the body 2 in overhanging relation to the front wheels 3, 3, respectively. The front fenders 13, 13 project laterally away from the vehicle body by a distance preferably 20 cm or less, such that they will not interfere with oncoming and passing cars.

The rear wheels 4, 4 are covered by a pair of respective rear fenders 14, 14 mounted on the body 2 and projecting laterally by a distance of 20 cm or less. Thus, the vehicle 1 has a reduced width at the footrest floor 2c arranged intermediately between the front and rear wheels.

The steering shaft 9 and the stay 11 are enclosed in a column 15 projecting upwardly from the front body portion 2b and provided on the upper end thereof with a decorative pad 15a disposed centrally of the handlebar 10.

The vehicle 1 has a windshield unit 16, with a rounded face, extending upwardly and rearwardly from a forward end of the body 2, the rearward end of windshield unit 16 being disposed substantially above the seat 8. The windshield unit 16 has a frame 17 fabricated of metal and having a channel-shaped cross section opening forwardly as shown in FIGS. 7 and 8. The frame 17 in its entirety has an inverted U-shaped configuration in front elevation as shown in FIG. 5, and is slanted rearwardly as shown in side elevation in FIG. 4. The frame 17 is mounted in a cantilevered fashion on the body 2 and has a pair of lower ends 17a fastened to a bracket 18 attached laterally to the body 2 (FIG. 5) and an upper end 17b arranged to extend laterally over a position forward of the head of the driver seated on the seat 8.

Figure 6:
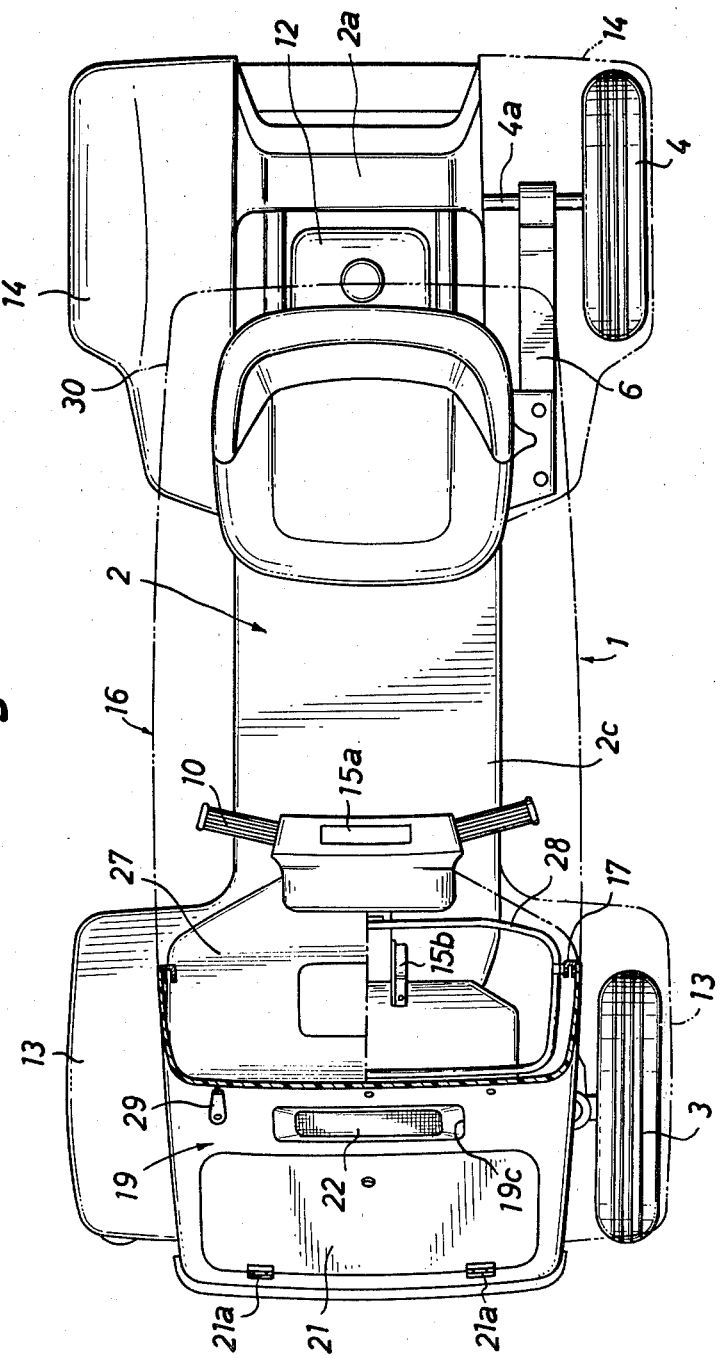
FIG. 6 is a plan view of the vehicle, with parts broken away.

The frame 17 is covered at its lower portion by a cover 19 extending upwardly from a front end of the body 2 to substantially the same level as the upper end of column 15, and bridged between upstanding portions 17c, 17c of the frame 17. The lower cover 19 is substantially channel-shaped in horizontal cross section as shown in FIGS. 6 and 8, and has a widthwise intermediate round face portion 19a spaced forwardly from the handlebar 10. The lower cover 19 includes a pair of bent portions 19b on respective opposite sides of the intermediate portion 19a and each having an end fastened to an outer side of one of the upstanding portions 17c, 17c of the frame 17. The width of cover 19 is substantially the same as or slightly smaller than the distance between the front wheels 3, 3.

As shown in FIGS. 4, 8 and 10, a container or luggage chamber 20 is defined by a rearwardly recessed wall 19c of the cover 19 and disposed forwardly of the column 15, the container 20 having a frontal opening G closable by a container lid 21 pivotably attached at a lower end thereof by hinges 21a. More specifically, as shown in FIGS. 8 and 10, the container 20 has a space A defined by a pair of parallel sidewalls E, E extending rearwardly substantially parallel to sidewalls 19b of the cover member 19, a rear wall B defined by wall 19c extending obliquely parallel to a front wall of the column 15, a flat lower wall C, and an upper wall D having a flat portion parallel to the lower wall C and a slanted portion integral with the rear wall B. The frontal opening G of the space A is defined by a shoulder F. Because the column 15 extends obliquely and rearwardly and the lower cover 19 has a relatively large width, the container 20 has an increased volume necessary for accommodating articles desired to be transported. As shown in FIG. 4, the lower wall C is fastened to a stay 18a attached to the bracket 18 (FIG. 9), and the upper wall D is fastened at the slanted portion thereof to the column 15 by a bracket 15b (FIG. 4), the stay 18a and the bracket 15b serving to support the windshield unit 16.

The container lid 21 is angularly movable between the solid-line and broken-line positions in FIG. 10 to close and open the space A. A sealing member or gasket H is mounted on and around the shoulder F for sealing engagement with a rib 21d extending along the edge of the lid 21. The upper wall D supports thereon a lock mechanism 21b, and an engagement member 21c provided on lid 21 engages lock mechanism 21b for locking lid 21 in the closed position. The lid 21, when in the closed position thereof, comprises a front part of the cover 19.

Due to the provision of the container 20, a space between the windshield unit 16 and the column 15 can be effectively utilized for housing articles desired to be transported, such as baggage. When such articles are stored in the container 20, which is disposed at a relatively lower position, the vehicle 1 is stabilized while in motion under the influence of the wind pressure applied to the windshield unit 16, due to its lowered center of gravity. A state of balance at the front and rear ends of vehicle 1 is maintained due to the windshield unit 16 with the container 20 and the engine disposed at the front and rear ends, respectively, of the vehicle 1. Because the container 20 is covered with the lid 21, the windshield unit 16 is aesthetically pleasing and the container 20 is protected from rain, road dirt, etc. Further, because container 20 is built in the windshield unit 16, no additional parts are required to provide container 20 other than a part of the windshield unit 16. Therefore, provision of the container 20 necessitates no substantial labor, time, or cost.

A headlamp 22 is housed in a recessed portion 19d (FIG. 4) of the cover 19 above the container 20. A windshield panel 24 forming a main part of the windshield unit 16 extends upwardly of the cover 19 and has a lower edge connected via a horizontal decorative strip 23 to the cover 19 and an upper, rearwardly bent edge 24b inserted in a groove (not shown) in the upper end 17b of the frame 17. In other words, the windshield panel 24 is dimensioned to extend from the container 20 to the head of a driver seated on the seat 8. As illustrated in FIG. 7, the windshield panel 24 is substantially channel-shaped in horizontal cross section, having a pair of sidewalls 24a, 24a directed rearwardly. Therefore, the windshield panel 24 and the lower cover 19 are similarly shaped in cross section. The sidewalls 24a, 24a have a minimal depth in the longitudinal direction of the vehicle to minimize the influence of side wind. The sidewalls 24a, 24a have respective distal edges inserted in grooves, respectively, in the upstanding portions 17c, 17c of the frame 17. As shown in FIG. 4, the sidewalls 24a, 24a become progressively narrower toward the upper ends thereof.

The lower cover 19 and the windshield panel 24 are spaced forwardly from the handlebar 10 by a distance which is sufficiently large to permit the handlebar 10 to be manipulated without obstruction. The lower cover 19 and the windshield panel 24 are fabricated of synthetic resin, the panel 24 being transparent. The windshield panel 24 supports a central pane of glass 25 having an extensive area in front of the head of the seated driver. The pane of glass 25 is supported by a sealing rubber retainer 26 extending peripherally therearound and mounted on and around the edge of an opening 24c provided in the windshield panel 24.

The windshield unit 16 provides an overhang for the driver seated on the seat 8 and extends in front of and above the driver to provide effective protection against rain and wind, thereby weatherproofing the small-sized vehicle 1 to permit more frequent use of vehicle 1, i.e., even under adverse weather conditions. The windshield unit 16 extending in front of the handlebar 10 has substantially the same width as the length of the handlebar 10, thus protecting the handlebar 10 from rain and wind. Further, because the windshield unit 16 has substantially the same width as the length of the handlebar 10 and is spaced forwardly therefrom, the handlebar 10 can be steered or manipulated easily and freely, and no lateral projections exist other than the wheels and fenders, thus permitting the driver to drive the vehicle 1 with concern substantially over only the width of the windshield unit 16. Further, the driver can freely get on and off the vehicle from the sides thereof, is provided with an unobstructed view, and at the same time is protected from rain and wind when seated on the seat 8. Therefore, the driver can drive and handle the weatherproof vehicle 1 in substantially the same manner as he would drive and handle a conventional two-wheeled vehicle such as a motorcycle.

Because the windshield unit 16 is cross-sectionally channel-shaped, the mechanical strength and rigidity thereof is enhanced, while at the same time it is lightweight. The sidewalls 24a, 24a of the unit 16 are directed rearwardly to thereby guide rain and wind in a directly rearward direction past the driver to prevent him from getting wet. Further, sidewalls 24a, 24a prevent rain and wind from sweeping around to hit the rear side of the windshield panel 24, thereby providing the driver with a clear view through the windshield glass pane 25. Because the windshield unit 16 has a rounded face and a minimum width for covering the handlebar 10, the unit 16 guides rain and wind smoothly rearwardly along the sidewalls thereof, with minimum resistance to forward movement of the vehicle 1 against rain and wind.

The lower edge of the windshield panel 24 is fastened to the front end of a cover member 27 extending between the lower edge of the panel 24 and an upper end of the column 15, and is also supported at lateral ends thereof by a bracket 28 mounted on the column 15 (FIGS. 4, 5, 6 and 9). The cover member 27 has a portion thereof secured to the bracket 28, such portion comprising the decorative strip 23. The lateral ends of the cover member 27 which are supported by the bracket 28 are also fastened to the upstanding portions 17c, 17c of the frame 17.

A windshield wiper 29 is attached to the windshield panel 24 at a laterally displaced position (FIG. 2) thereon for wiping the glass pane 25. As shown in FIGS. 2 and 5, the windshield unit 16 becomes progressively narrower from the lower end toward the upper end thereof, however, the overall width thereof is substantially the same as the length of the handlebar 10.

A roof plate 30 forming a remaining portion of the windshield unit 16 extends rearwardly from the upper end 17b of the frame 17 such that a sufficient clearance is provided over the head of the seated driver, the roof plate 30 extending substantially over the seat 8 to cover same. The width of roof plate 30 becomes progressively smaller rearwardly as shown in FIG. 3, and has a substantially channel-shaped cross section opening downwardly. The overall width of the windshield unit 16 is greater than that of the footrest floor 2c, so that the windshield unit 16 projects laterally beyond the footrest floor 2c in overhanging relation. The roof plate 30 protects the driver from rain even when the vehicle is at rest, such as while waiting for a traffic signal, etc.

A bumper 31 is mounted on a lower front portion of the lower cover 19 at a position just below the container lid hinges 21a.

As shown in FIG. 9, the windshield unit 16 is available as a prefabricated unitary assembly I including the lower cover 19, windshield panel 24, roof plate 30, the frame 17, container 20, and bumper 31. The unitary assembly I can be detachably mounted on the vehicle 1 with utmost ease. More specifically, the unitary assembly I can be attached to the vehicle 1 by fastening the lower ends 17a of frame 17 to bracket 18, fastening bracket 28 to panel 24 at the front end thereof and to attachments 28b on the column 15 at the rear ends 28a, thereof, and fastening bracket 15b on column 15 to the upper wall of container 20. The cover member 27 comprises a first member 27a attached to windshield panel 24 and a second member 27b attached to bracket 15b on column 15 (FIG. 9), the first and second members 27a, 27b being interconnected for assembling the windshield unit 16. By virtue of such arrangement, the vehicle 1 and windshield unit 16 can be separated to facilitate shipment, and assembled together simply by fastening with screws and/or bolts and nuts. Further, the windshield unit 16 can be readily dismounted from vehicle 1 to facilitate maintenance and servicing.

Although there have been described what are at present considered to be the preferred embodiments of the invention, it will be understood that the invention may be embodied in other specific forms without departing from the spirit or essential characteristics thereof. The present embodiments are therefore to be considered in all respects as illustrative, and not restrictive. The scope of the invention is indicated by the appended claims rather than by the foregoing description.

I claim:

1. A small-sized vehicle, comprising:
    a vehicle body having a pair of front wheels, said vehicle body having a width dimension substantially equal to the average width of a driver's shoulders;
    a handlebar for steering said front wheels, said handlebar being disposed substantially centrally in the width direction of a front portion of said vehicle body;
    a driver's seat disposed substantially centrally in the longitudinal direction of said vehicle body;
    a footrest floor extending between said handlebar and said seat;
    a windshield unit mounted on and extending upwardly and rearwardly from a front end of said vehicle body so as to be disposed in overhanging relation to said handlebar and said driver's seat;
    the width of said footrest floor being less than the width of said windshield unit; and
    said windshield unit comprising:
        a lower cover mounted on said body and having a width which is substantially the same as the distance between said front wheels;
        a windshield panel connected to said lower cover, said lower cover and said windshield panel being slanted rearwardly;
        a roof member connected to an upper end of said windshield panel and extending rearwardly therefrom with the rear end thereof disposed substantially above said driver's seat; and
        wherein the width of said windshield unit becomes progressively smaller upwardly and rearwardly.

2. A small-sized vehicle according to claim 1, wherein:
    said windshield unit is substantially channel-shaped in horizontal cross section, and includes a pair of sidewalls directed rearwardly.

3. A small-sized vehicle according to claim 1, wherein:
    the width of said windshield is substantially the same as the length of said handlebar.

4. A small-sized vehicle according to claim 2, wherein:
    each of said sidewalls becomes progressively narrower upwardly.

5. A small-sized vehicle according to claim 1, wherein:
    said windshield unit includes a frame having an inverted U-shaped configuration; and
    said frame includes a pair of upstanding portions having the lower ends thereof fastened to said body.

6. A small-sized vehicle according to claim 5, wherein:
    said lower cover is disposed substantially adjacent to said body and between said upstanding portions, and said windshield panel extends upwardly of said lower cover between said upstanding portions of said frame.

7. A small-sized vehicle according to claim 6, further comprising:
    a column mounted on said vehicle body and supporting said handlebar; and
    wherein at least one of said lower cover and said windshield panel is fastened by an intermediate member to said column.

8. A small-sized vehicle according to claim 6, wherein:
    said lower cover and said windshield panel are substantially channel-shaped in horizontal cross section opening rearwardly, and have a rounded face.

9. A small-sized vehicle according to claim 1 or 6, wherein:
    said lower cover, said windshield panel, and said roof member are assembled together and are detachably mounted on said vehicle body.

10. A small-sized vehicle according to claim 1, wherein:
    said windshield unit includes a container therein.

11. A small-sized vehicle according to claim 10, wherein:
    said container is disposed at a lower position in said windshield unit, substantially adjacent to said vehicle body.

12. A small-sized vehicle, comprising:
    a vehicle body having a pair of front wheels;
    a handlebar for steering said front wheels, said handlebar being disposed substantially centrally in the width direction of a front portion of said vehicle body;
    a driver's seat disposed substantially centrally in the longitudinal direction of said vehicle body;
    a footrest floor extending between said handlebar and said seat;
    a windshield unit mounted on and extending upwardly and rearwardly from a front end of said vehicle body so as to be disposed in overhanging relation to said handlebar and said driver's seat;
    said windshield unit including a container therein;
    said windshield unit including a lower cover; and
    said container being provided with a hinged lid comprising a part of said lower cover.

* * * * *

UNITED STATES PATENT AND TRADEMARK OFFICE
CERTIFICATE OF CORRECTION

PATENT NO. : 4,372,602

DATED : February 8, 1983

INVENTOR(S) : Toshio Tsuchiya, Akito Enokimoto, Sadao Mizushima and Suwaji Takano It is certified that error appears in the above-identified patent and that said Letters Patent are hereby corrected as shown below:

On the title sheet, left column, in item "[30]", change
"Japan ....................... 54-14069" to
--Japan ....................... 54-140691--.

Signed and Sealed this

Sixth Day of September 1983

[SEAL]

Attest:

GERALD J. MOSSINGHOFF

Attesting Officer     Commissioner of Patents and Trademarks